United States Patent
Lui et al.

(10) Patent No.: US 10,081,725 B1
(45) Date of Patent: Sep. 25, 2018

(54) WOVEN GEOTEXTILE FABRIC DERIVED FROM BETA-NUCLEATED, POLYPROPYLENE YARN OR MONOFILAMENT

(75) Inventors: Kam Chung Lui, Kennesaw, GA (US); Hugh Chester Gardner, Roswell, GA (US)

(73) Assignee: Propex Operating Company, LLC, Chattanooga, TN (US)

( * ) Notice: Subject to any disclaimer, the term of this patent is extended or adjusted under 35 U.S.C. 154(b) by 1213 days.

(21) Appl. No.: 13/073,397

(22) Filed: Mar. 28, 2011

(51) Int. Cl.
- *C08L 23/12* (2006.01)
- *C08K 5/00* (2006.01)
- *C08L 23/14* (2006.01)

(52) U.S. Cl.
CPC ............ *C08L 23/12* (2013.01); *C08K 5/0083* (2013.01); *C08L 23/142* (2013.01)

(58) Field of Classification Search
None
See application file for complete search history.

(56) References Cited

U.S. PATENT DOCUMENTS

| | | | |
|---|---|---|---|
| 4,643,119 A * | 2/1987 | Langston et al. | 112/421 |
| 5,925,434 A | 7/1999 | Phillips et al. | |
| 6,056,479 A * | 5/2000 | Stevenson et al. | 405/302.7 |
| 6,367,513 B1 * | 4/2002 | Cain | 139/383 R |
| 7,407,699 B2 | 8/2008 | Jacoby | |
| 2004/0096654 A1 * | 5/2004 | Morin | C08K 5/0083 428/364 |
| 2004/0185732 A1 * | 9/2004 | Bonner | B29C 43/006 442/185 |
| 2005/0203226 A1 * | 9/2005 | Mader et al. | 524/210 |
| 2006/0177632 A1 | 8/2006 | Jacoby | |
| 2009/0076215 A1 * | 3/2009 | Shelton et al. | 524/576 |
| 2009/0155614 A1 * | 6/2009 | McLeod et al. | 428/516 |
| 2009/0258212 A1 * | 10/2009 | Jacoby | 428/220 |
| 2010/0143687 A1 | 6/2010 | Jacoby | |
| 2011/0250448 A1 * | 10/2011 | Jones | C08L 23/12 428/359 |

FOREIGN PATENT DOCUMENTS

EP 0177961 * 4/1986

OTHER PUBLICATIONS

Machine translation of EP 0177961, Kathan, Apr. 1986.*
The National Center for Biotechnology Information (https://pubchem.ncbi.nlm.nih.gov/compound/Quinacridone#section=Information-Sources , page visited on Feb. 28, 2017).*
Beta nucleating masterbatch offers enhanced properties in polypropylene products, Plastics Additives and Compounding, May/Jun. 2007, pp. 28-31.

(Continued)

*Primary Examiner* — Shawn Mckinnon
(74) *Attorney, Agent, or Firm* — Husch Blackwell LLP

(57) ABSTRACT

A woven geotextile fabric derived from beta-nucleated polyolefin yarn or monofilament, the method of manufacture of fabric, and the use of such fabric are disclosed. The yarn is made by compounding one or more polyolefins and a beta-nucleator reagent wherein the compounded mixture is extruded then drawn to at least 9 times its original length. The yarn or monofilament is woven into synthetic fabric useful for roadway construction, embankment stabilization, and mechanically stabilized earth.

17 Claims, 4 Drawing Sheets

(56) References Cited

OTHER PUBLICATIONS

Microporous Polypropylene Films for Tape and Label Applications, presented at TECH31 (technical conference of the Pressure Sensitive Tape Council), May 7-9, 2008, Baltimore,MD.
BNX MPM 1113 product data sheet, available at www.mayzo.com, © 2007 by Mayzo, Inc.
Handbook of Geosynthetics, available at www.gmanow.com ; pp. 11-18, 30-33, and 40-45, © 2002 by Geosynthetic Materials Association.
AASHTO M 288-06, "Standard Specification for Geotextile Specification for Highway Applications," © 2006 by the American Association of Highway and Transportation Official.
Installation Guidelines, "Separation/Stabilization Geotextile Fabrics," available at www.geotextile.com , © 2006 by Propex Inc.
Engineering Bulletin, "Geotextile Functions in Paved and Unpaved Roads," available at www.geotextile.com , © 2006 by Propex Inc.
Engineering Bulletin, "Premium Woven Geotextiles for Roadway Stabilization," available at www.geotextile.com , © 2006 by Propex Inc.

* cited by examiner

WOVEN GEOTEXTILE FABRIC DERIVED FROM BETA-NUCLEATED, POLYPROPYLENE YARN OR MONOFILAMENT

FIELD

The present application pertains tp woven geotextile fabrics derived from beta-nucleated polyolefin yarn or monofilament, the method of manufacture of the woven geotextile fabric, and the use of the woven geotextile fabric in soil stabilization and reinforcement applications. More particularly, the present application relates to woven geotextile fabric derived from highly drawn, beta-nucleated polypropylene yarn or monofilament made by extruding a mixture of polypropylene and a beta-nucleator reagent into a film, slitting the film to make a yarn, drawing the yarn at least 9 times its original length, and weaving the yarn into a fabric.

BACKGROUND

The use of woven geotextiles in the stabilization and reinforcement of roadways, embankments, and retaining walls is common today.

More than 20 years ago, The American Association of State Highway and Transportation Officials (AASHTO) issued Specification M 288, which described the use and qualifications of geotextile fabrics for highway applications. That document detailed the basic requirements for fabrics used in the separation, stabilization, erosion control, and subsurface drainage for roadways. There, fabrics were expressed as belonging to three classes, with Class 1 designated for severe or harsh installation conditions and Classes 2 and 3 specified for less severe conditions. Class 2 woven geotextiles are typically made with monofilaments, and Class 3 woven geotextiles are typically made of slit yarns or tapes of highly oriented polypropylene.

The fabrics in the AASHTO M 288 document were specified based on the minimum properties related to fabric performance—such as grab strength, tear strength, and apparent opening size—rather than fabric basis weight. The AASHTO property profiles have been widely accepted within the road building community. Because woven geotextile fabrics can be more expensive than the materials they replace in a roadway, manufacturers have sought to produce such fabrics at the lowest possible cost.

One way to minimize cost of woven geotextile polymer fabric is by reducing the amount of polymer used to make the woven geotextile fabric, since the cost of the polymer is a major component of the finished woven geotextile fabric cost. For this approach to be successful, the required level of performance must be achieved with a woven geotextile fabric having a reduced basis weight. In terms of strength requirements, the woven geotextile fabric strength-to-weight ratio (STVVR) must be increased. The ability to increase woven geotextile fabric STVVR can be shown by either meeting a specific fabric strength requirement using a woven geotextile fabric with reduced weight, or by demonstrating higher strengths at equivalent fabric weight.

Since the introduction of the AASHTO M 288 specification, much effort has gone into optimizing fabrics to meet the required property profiles. Those efforts address a long-standing and continuing need to develop woven geotextiles that meet the required property profiles at lowest cost.

The need also exists for increased woven geotextile fabric strength and stiffness at the lowest possible cost for applications not covered by the AASHTO M288 specification, such as roadway reinforcement and mechanically stabilized earth systems.

BRIEF SUMMARY

One embodiment of the present invention contemplates a woven geotextile fabric comprised of a highly drawn beta-nucleated polymeric yarn or monofilament. The beta-nucleated yarn or monofilament is derived from an extruded blend of a polypropylene polymer and a beta-nucleator reagent. The highly drawn, beta-nucleated polypropylene yarn or monofilament has a draw ratio of at least 9:1. The woven geotextile fabric has a grab tensile strength at least 8% higher than does an otherwise identical fabric woven without the highly drawn beta-nucleated polypropylene yarn or monofilament. The woven geotextile fabric can contain the highly drawn, beta-nucleated polypropylene yarn or monofilament as a fill yarn, a warp yarn or as both a fill yarn and a warp yarn of the fabric. The geotextile fabric can further comprise an additive, such an opacifier, a pigment, a dye, a lubricant, an antistatic agent, an antioxidant, an UV absorber, or mixtures thereof. The woven geotextile fabric can be a single layer or multiple layers.

The woven geotextile fabric exhibits a greater STWR than an otherwise identical fabric that did not include the beta-nucleator reagent but was manufactured under identical conditions.

A method of making such a woven geotextile fabric is also provided. This method comprises extruding a mixture of a polypropylene resin and a beta-nucleator reagent and maintaining the extruded film or monofilament for a time and at a temperature so that beta crystallites form within the film or monofilament. If a cast film is used, the film is slit, then uniaxially drawn at a ratio of at least 9:1. Alternatively, the film can be drawn first, and then slit to make a yarn. If a monofilament is produced, it is drawn at least 9:1. The oriented yarn or monofilament is then woven into a fabric. Both or just one of the warp and fill yarns or monofilaments can be derived from beta-nucleated polypropylene.

It is contemplated that the woven geotextile fabric of the present invention can be used in a method for increasing the strength and durability of a roadway. This method entails placing the woven geotextile fabric on the surface of the sub-grade wherein the woven geotextile fabric comprises highly drawn, beta-nucleated polypropylene yarn or monofilament, followed by placing aggregate on the surface of the fabric, then compacting the aggregate to produce a roadway having increased strength and durability.

The woven geotextile fabric may also be used in methods to reinforce roadbeds, create hard armor systems for erosion control on embankments, and construct mechanically stabilized earth systems.

The present invention has several benefits and advantages. A particular benefit is that the woven geotextile fabric has increased durability by providing greater tensile and tear strength than an otherwise identical fabric that did not include a beta-nucleated yarn but was manufactured under nearly identical conditions. The fabric made with beta-nucleated polypropylene yarn or monofilaments also has increased stiffness compared to an otherwise identical fabric not made with beta-nucleated polypropylene yarn or monofilament. These improved physical properties can lead to significant reductions in the amount of raw materials required for production and a resultant lower cost of the final product. Further benefits and advantages will be apparent to the worker of ordinary skill from the disclosure that follows.

DETAILED DESCRIPTION

Figure 1:
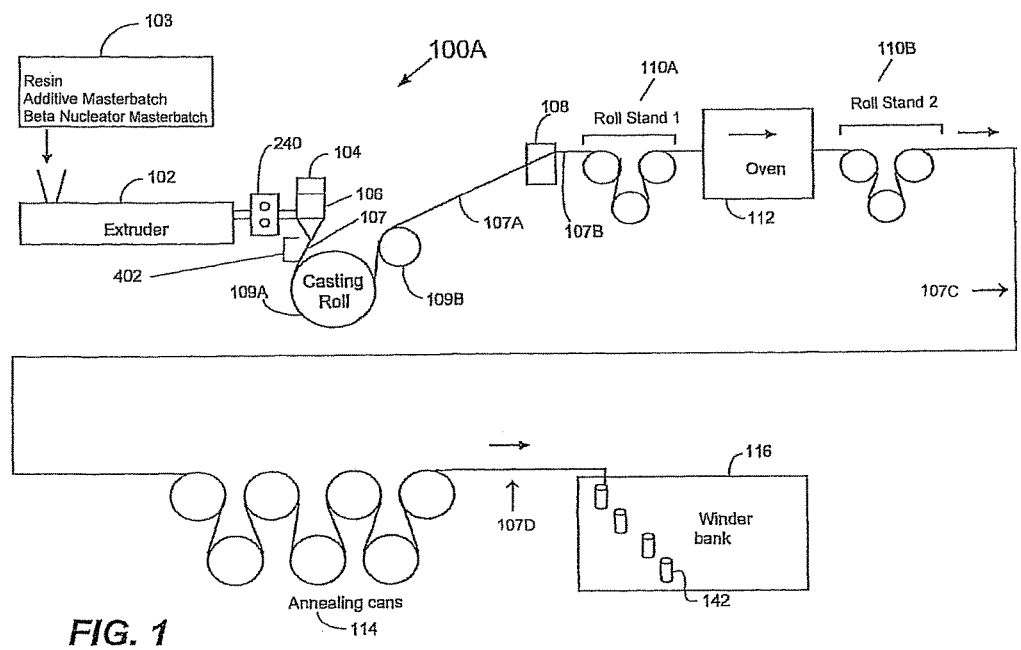
FIG. 1 illustrates a schematic of a production line for highly oriented beta-nucleated polypropylene yarn for high strength woven geotextile fabric.

The present application relates to a woven geotextile fabric derived from highly drawn, beta-nucleated polymeric yarn or monofilament, the method of manufacture of such a fabric, and the use of the resulting woven geotextile fabric to enhance the performance of paved and unpaved roadways as well as embankments and mechanically stabilized earth systems.

A woven geotextile fabric comprised of a highly drawn, beta-nucleated polypropylene yarn or monofilament is contemplated herein. The highly drawn, beta-nucleated polypropylene yarn or monofilament of the fabric has a draw ratio of at least 9:1. Surprisingly, the woven geotextile fabric has a grab tensile strength at least 8% higher than does an otherwise identical fabric woven without the highly drawn beta-nucleated polypropylene yarn or monofilament.

In one embodiment, the woven geotextile fabric contains a highly drawn, beta-nucleated polypropylene yarn or monofilament as fill yarn. In another embodiment, the woven geotextile fabric contains a highly drawn, beta-nucleated polypropylene yarn or monofilament as a warp yarn. In yet another embodiment, the woven geotextile fabric contains both a highly drawn, beta-nucleated polypropylene fill yarn or monofilament and a highly drawn, beta-nucleated polypropylene warp yarn.

It is contemplated that interlacing the warp and fill yarns in the woven geotextile fabric results in a fabric construction such as a plain weave, a twill weave, a satin weave, a half basket weave, a crowfoot weave, a honeycomb weave, a modified honeycomb weave, a leno weave, a mock leno weave, a warp-rib weave, a fill-rib weave and variations thereof. In one embodiment, a fabric construction is a plain weave. In another embodiment, the fabric construction is a half basket weave.

The basis weights of the woven geotextiles are typically 3 to 16 ounces/sq yd, although fabrics with either higher or lower weights may be useful in some applications. With yarns, warp counts are typically 8 to 30 ends per inch, and fill counts are 6 to 22 ends per inch. Warp yarns are typically 40 to 120 mils wide, and fill yarns are 60 to 250 mils wide. With monofilaments, warp counts are typically 8 to 35 ends per inch, and fill counts are 8 to 25 per inch. Monofilaments used in the warp are typically 20 to 60 mils wide. In the fill direction, monofilaments are 25 to 70 mils wide.

In another embodiment, the woven geotextile fabric further comprises an additive selected from the group consisting of an opacifier, a pigment, a dye, a lubricant, an antistatic agent, an antioxidant, and a UV absorber. In one embodiment, the additive comprises carbon black.

It is contemplated that the woven geotextile fabric comprises the highly drawn beta-nucleated yarn or monofilament having a denier in the range of 300 to 3000. Both single-layer and multi-layer woven geotextile fabrics are contemplated herein.

Also contemplated herein is a method of making a woven geotextile fabric. In one embodiment, the method entails extruding a mixture of a polypropylene resin and a beta-nucleator reagent to form a film; maintaining the film for a time at a temperature so that at least 10% by weight beta crystallites form within the film; slitting the film to form a yarn; uniaxially drawing the yarn at a ratio of at least 9:1; and converting the yarn into a fabric. Weaving of the yarn into a fabric can be carried out using projectile looms, rapier looms, or air jet looms.

In an alternate method, the film is first is drawn, and then slit to make a yarn prior to beaming and weaving. In one embodiment, the yarn is a fill yarn that is taken up on bobbins. In another embodiment, the yarn is a warp yarn. The warp yarn can be converted into a loom beam. In still another embodiment, the slit yarn is replaced with a monofilament that is extruded with a cross section that approximates the shape of the die orifice.

It is contemplated that the woven geotextile fabric comprises a weave such as plain weave, a twill weave, a satin weave, a half basket weave, a crowfoot weave, a honeycomb weave, a modified honeycomb weave, a leno weave, a mock leno weave, a warp-rib weave, a fill-rib weave and variations thereof.

It is also contemplated that the beta-nucleator reagent used in the method is selected from the group 5,12-dihydroquino[2,3-b]acridine-7,14-dione; isophthalic acid; terephthalic acid; the disodium salt of o-phthalic acid; an aluminum salt of 6-quinizarin sulfonic acid; N,N'-dicyclohexyl-2,6-naphthalene dicarboxamide; and mixtures thereof.

In another embodiment of the present invention, a method of making a woven geotextile fabric is disclosed. This method comprises extruding a mixture of a polypropylene resin and a beta-nucleator reagent to form a monofilament; maintaining the monofilament for a time at a temperature so that at least 10% by weight of beta crystallites form within the monofilament; uniaxially drawing the monofilament at a ratio of at least 9:1; and converting the monofilament into a fabric.

In this embodiment, the monofilament is a fill yarn taken up on bobbins. Alternatively, the monofilament is a warp yarn. The monofilament can be converted into a loom beam. The woven geotextile fabric of this embodiment comprises a weave such as a plain weave, a twill weave, a satin weave, a half basket weave, a crowfoot weave, a honeycomb weave, a modified honeycomb weave, a leno weave, a mock leno weave, a warp-rib weave, a fill-rib weave and variations thereof.

In another embodiment, a polymeric yarn or monofilament drawn at least 9×its original length and derived from an extrusion of a polypropylene polymer and a beta-nucleator reagent where the yarn exhibits greater tenacity and greater tensile modulus than an otherwise identical yarn that did not include the beta-nucleator reagent but was processed under identical conditions is contemplated.

In one aspect, the highly drawn polypropylene polymer or monofilament is a polymer containing at least one propylene unit. In another aspect; the propylene polymer is a polypropylene homopolymer. In yet another aspect, the propylene polymer is a random or impact copolymer of polypropylene and one or more other olefins. In still another aspect, the polypropylene polymer is a mixture of polypropylene homopolymer and copolymers.

For highly drawn beta-nucleated yarn and monofilament, it is contemplated that the polypropylene polymer has a melt flow rate (MFR) in the range of about 0.1 to about 5 g/10 minutes when tested according to ASTM method D 1238 Condition L. Alternatively, polypropylene polymers with values outside this range can be blended in proper proportion to meet this desired range. In one embodiment for highly drawn polymeric yarn or monofilament, the polypropylene polymer comprises a blend of a polypropylene homopolymer resin with a melt flow rate of 4 g/10 minutes and polypropylene impact copolymer resin with a melt flow rate of 0.8 g/10 minutes.

In addition to the polypropylene polymer, another component of the blend that makes up the polymeric yarn is a beta-nucleator reagent. The beta-nucleator reagent is an agent that promotes the development of beta crystallites in the extruded film or monofilament.

It is contemplated that the beta-nucleator reagent is selected from the group 5,12-dihydroquino[2,3-b]acridine-7,14-dione; isophthalic acid; terephthalic acid; the disodium salt of o-phthalic acid; an aluminum salt of 6-quinizarin sulfonic acid; N, N'-dicyclohexyl-2,6-naphthalene dicarboxamide; and mixtures thereof. An example beta-nucleator reagent is 5,12-dihydro-quino[2,3-b]acridine-7,14-dione. The beta-nucleator reagent is typically present in the amount of 0.5 ppm to 5000 ppm.

The highly drawn yarn has been drawn at least 9.0×. Although the yarn contains beta-nucleator reagents, after drawing it consists entirely of polypropylene with alpha crystallites. The specific gravity of the highly drawn yarn of the invention is up to about 5% less than the specific gravity of an otherwise identical yarn made by the same process with the same formulation but without the beta-nucleator.

The highly drawn yarn of the invention has 1) a tenacity at least equal to and 2) a Young's modulus at least about 5% higher than those of an otherwise identical yarn made by the same process with the same formulation but without the beta-nucleator.

In another embodiment, the highly drawn polymeric yarn further comprises an additive selected from the group of an opacifier, a pigment, a dye, a lubricant, an antistatic agent, an antioxidant, and a UV absorber. A preferred embodiment comprises carbon black as the additive.

It is contemplated that the highly drawn yarns have cross sections that are rectangular or serrated with a width to thickness ratio of 15:1 or greater, preferably 20:1 or greater. Serration patterns such as those in U.S. Pat. No. 5,925,434, herein incorporated by reference, are possible. Yarns with rectangular cross sections (i.e., flat tapes) are commonly made by slitting a film into thin strips using a series of razor blades or other cutting devices. The yarn extruded individually as monofilaments have cross sections that approximate the shape of the die orifice. For monofilaments, the width to thickness ratio for monofilaments can be 4:1 to 20:1, and cross sections may be rectangular, oval, or multi-lobal. The denier of the highly drawn yarn or monofilaments is between 300 and 3000, preferably between 500 and 2500.

A process for producing a highly drawn polymeric yarn or monofilament is also contemplated in the present invention. In one embodiment, the process comprises extruding a mixture of a polypropylene resin and a beta-nucleator reagent to form a film and maintaining the film for a time at a temperature so that at least 10% by weight beta crystallites form within the film. The film having beta crystallites can then be slit to make a yarn. The yarn is then drawn uniaxially at a ratio of at least 9:1. Alternatively, the film can be drawn at a ratio of at least 9:1, then slit to make the yarn.

In one embodiment, the polypropylene polymer comprises a polypropylene homopolymer. In another embodiment, the polypropylene polymer comprises a copolymer of polypropylene and one or more other olefins. In yet another embodiment, the polypropylene polymer comprises a polypropylene homopolymer, a copolymer and mixtures thereof. In yet another embodiment, the polypropylene polymer comprises a mixture of a polypropylene homopolymer resin with a melt flow rate of 4 g/10 minutes and a polypropylene impact copolymer resin with a melt flow rate of 0.8 g/10 minutes.

In one aspect, the process further comprises adding an additive selected from the group consisting of an opacifier, a pigment, a dye, a lubricant, an antistatic agent, an UV absorber, and an antioxidant. In one embodiment, the additive comprises carbon black.

It is contemplated that the beta-nucleator reagent is selected from the group 5,12-dihydroquino[2,3-b]acridine-7,14-dione; isophthalic acid; terephthalic acid; the disodium salt of o-phthalic acid; an aluminum salt of 6-quinizarin sulfonic acid; N,N'-dicyclohexyl-2,6-naphthalene dicarboxamide; and mixtures thereof. One example of beta-nucleator reagent is 5,12-dihydro-quino[2,3-b]acridine-7,14-dione. The beta-nucleator reagent is typically present in the amount of 0.5 ppm to 5000 ppm.

Because only a very small amount of a highly active beta-nucleator such as 5,12-dihydroquino[2,3-b]acridine-7,14-dione is needed to create beta-nucleated polypropylene, the reagent may be provided as a masterbatch. The masterbatch is a highly diluted version of the active reagent that is easier to add and accurately measure during extrusion. A preferred commercially available masterbatch is Mayzo MPM 1113 from Mayzo, Inc., Norcross, Ga. That masterbatch consists of pellets comprising a beta-nucleator reagent in a polypropylene carrier. The recommended addition rate is 0.2 to 2 parts by weight per 100 parts of the total formulation (i.e., 0.2 to 2 wt %).

Alternatively, the beta-nucleator reagent can be compounded directly into the polypropylene resin by the resin manufacturer. Beta-nucleated resins can be supplied in pellet form. *Borealis* AG (Vienna, Austria) is one supplier of resins of this type.

A process for producing a highly drawn polypropylene monofilament is also contemplated herein. The process comprises extruding a mixture of a polypropylene polymer and a beta-nucleator reagent to form a monofilament, maintaining the monofilament for a time at a temperature so that at least 10% by weight of beta crystallites form, and uniaxially drawing the monofilament at a ratio of at least 9:1.

The polypropylene polymer comprises a polypropylene homopolymer in the process in one embodiment. In another embodiment, the propylene polymer comprises a copolymer of polypropylene and one or more other olefins. In yet another embodiment, the polymer comprises a polypropylene homopolymer, a copolymer, and mixtures thereof. In yet another embodiment, the polypropylene polymer comprises a mixture of a polypropylene homopolymer resin with a melt flow rate of 4 g/10 minutes and a polypropylene impact copolymer resin with a melt flow rate of 0.8 g/10 minutes.

The process further comprises adding an additive selected from the group consisting of an opacifier, a pigment, a dye, a lubricant, an antistatic agent, an UV absorber, and an antioxidant. In one embodiment, the additive comprises carbon black.

In such as process, the beta-nucleator reagent is selected from the group consisting of 5,12-dihydroquino[2,3-b]acridine-7,14-dione; isophthalic acid; terephthalic acid; the disodium salt of o-phthalic acid; an aluminum salt of 6-quinizarin sulfonic acid; N, N'-dicyclohexyl-2,6-naphthalene dicarboxamide; and mixtures thereof. In one embodiment, the beta-nucleator reagent is present in the range of about 0.5 to about 5000 ppm.

Referring now to FIG. 1, this Figure illustrates one exemplary system, 100A, for a yarn production line.

In this exemplary system, 100A, the blended resin is fed from a blender 103 into a single screw extruder 102 and then extruded at a temperature of 400° F. to 550° F. through a screen changer 240, melt pump 104, and film die 106. The extruded film 107 is deposited on a casting roll 109A that is maintained at a predetermined speed and temperature. The film thickness is typically 4 to 15 mils. In this exemplary system, the predetermined distance or space between exit of the die and the first contact point on the primary casting roll 109A can comprise a gap 402 of about 1.0 to about 5.0 inches.

The temperature and time are chosen to allow at least 10% by weight beta crystallites to form within the resulting film. Preferably more than 25% beta crystallites form in the film. The amount of beta crystallites depends on the type and amount of beta-nucleator reagent, temperature and residence time of the extruded film or monofilament, and presence of materials that accelerate the formation of alpha crystals in the polypropylene resin. With 1.0 weight percent of the MPM 1113 beta-nucleant masterbatch in a cast film with a thickness of about 9 mils, preferred times and temperatures are 190 to 220° F. for two or more seconds. Similar times and temperatures may be used with levels of MPM 1113 as low as 0.25 percent by weight. The preferred conditions for beta crystallite formation may be obtained using a heated casting roll or heated liquid bath. Somewhat longer times for beta crystallite growth are required when ovens replace the casting roll or liquid bath as the means to provide the temperature and when the extrudate is a monofilament, which has a greater thickness than film. In the absence of additives that preferentially accelerate the formation of alpha crystallites in polypropylene, as little as 2 ppm of a highly active beta-nucleator such as 5,12-dihydroquino[2,3-b]acridine-7,14-dione can create in excess of 10% by weight beta crystallites when the film is subjected to the times and temperatures mentioned above. The exposure of the extruded resin to the recommended times and temperatures must begin immediately, because polypropylene spontaneously forms alpha crystallites upon cooling. The preferred temperature range of 190 to 220° F. allows beta crystallites to grow at a rate that is competitive with alpha crystallite formation. The amount of beta crystallites can be determined by x-ray crystallography.

After the film 107A leaves the casting roll 109A it passes over a secondary roll 109B and through a slitter 108, where it is cut into thin strips. The strips 107B are conveyed over roll stand 110A, through oven 112, and to roll stand 110B. The drawing step is preferably carried out in an oven. The draw ratio is typically 9:1 to 11:1 for polypropylene resin with melt flow rates of about 3 to 4 g per 10 minutes. Higher draw ratios may be used for resin formulations with lower melt flow rates. Typical oven temperatures are 270° F. to 340° F., although temperatures outside that range may be used. Drawing may be carried out in a single oven or in more than one oven.

The yarn is highly drawn, since drawing is required to develop high stiffness and strength in yarns for woven geotextile applications. The draw ratio is 9:1 or higher to insure that woven geotextile fabrics with the desired property profiles are produced. However, for some applications, a lower draw ratio may be satisfactory.

The highly drawn yarn 107C then pass over a series of annealing rolls 114, which are heated and turn at adjustable speeds to relax the yarn. Typical annealing temperatures are 120° F. to 220° F. with relaxations in the range of 1 to 5 percent. Higher amounts of relaxation are not preferred, since they reduce the breaking strength of the highly drawn yarns or monofilaments.

The annealed and relaxed yarn 107D is taken up on bobbins 142 in winder bank 116. Such yarn may be used for fill yarn or warp yarn in the woven geotextile. If a winder taking up multiple warp ends (e.g., 300 ends) is substituted for the winder bank, the resulting beam may be used as part of a loom beam. Alternatively, the bobbins from the winder bank can be placed on a creel and then wound onto a beam that is inserted as the warp on a loom weaving geotextile fabrics.

In another embodiment, the process further comprises adding an additive selected from the group consisting of an opacifier, a pigment, a dye, a lubricant, an antistatic agent, an antioxidant, and an UV absorber. In one preferred embodiment, the additive comprises carbon black.

The present invention also contemplates a method of increasing the strength and durability of a roadway. This method entails the placement of a woven geotextile fabric on the surface of the sub-grade of the roadway wherein the woven geotextile fabric has a grab tensile strength of at least 200 pounds in both warp and fill directions. Next, aggregate is placed on the surface of the fabric, followed by compaction of the aggregate to produce a roadway having increased strength and durability. In this application, the woven geotextile fabric functions as a separator fabric by preventing intrusion of sub-grade soil into the aggregate base or sub-base while also preventing migration of the aggregate base into the sub-grade.

The method can further involve initially preparing the roadway by clearing the roadway surface of sharp or pointed materials that could puncture the woven geotextile fabric.

In one embodiment, at least 80%, preferably at least 90%, of the involved section of the roadway surface is covered by the woven geotextile fabric. In another embodiment, the fabric is applied as strips, pieces, or panels that are overlapped or sewn together to mimic the shape of the roadway. In general, the aggregate comprises inorganic filler material and is layered on top of the fabric at a depth of at least about 4 inches.

The present invention also contemplates a method of reinforcing a roadway built on soft soil, such as those with a California Bearing Ratio between 1 and 3, with the woven geotextile. This method entails placing a woven geotextile fabric comprised of highly drawn, beta-nucleated polypropylene yarns or monofilaments and has a grab tensile strength of at least 200 pounds, and preferably greater than 300 lbs, in both warp and fill directions on the sub-grade or sub-base, then covering the fabric with aggregate base, followed by distributing the aggregate into a layer with substantially uniform thickness. The fabric serves as a reinforcing layer to support construction equipment by increasing the bearing capacity of the sub-grade.

The present invention also contemplates a method of erosion control with hard armor systems comprising the woven geotextile fabric. This method entails optionally grading and smoothing the slope so that there are no sharp projections, applying the woven geotextile fabric to the soil by unrolling the woven geotextile fabric with the machine direction of the fabric parallel to a flow of water, wherein the fabric comprises highly drawn, beta-nucleated polypropylene yarn or monofilament and has a grab tensile strength of at least 200 pounds so that it is in intimate contact with the soil, anchoring the terminal ends of the woven geotextile, and placing hard armor, such as rip rap, on top of the fabric, starting from the toe and working to the crest of the slope. The armor should not be dropped from a height that damages the fabric. An additional layer of aggregate can be added, if needed, prior to positioning the rip rap.

The present invention also contemplates a method of constructing mechanically stabilized earth systems such as reinforced steepened slopes. This method entails preparing a level foundation of stable soil or bed rock by excavating soil from a slope, installing a geosynthetic drainage medium at the limits of the reinforced soil zone to collect and control ground water seepage, placing and compacting horizontal layers of soil against the bedrock or foundation soil level, placing the woven geotextile fabric comprised of highly drawn beta-nucleated yarn or monofilament horizontally between layers of compacted soil to provide tensile forces to resist soil layer movement, placing alternating layers of compacted soil and woven geotextile fabric until the full height of the reinforced steepened slope is attained, and applying surface protection such as vegetation or concrete slabs to the exposed slope surface to control erosion and water ingress.

Test Methods: In the Examples with Controls that follow, the following test methods were used:
   Melt flow rate (MFR): ASTM D 1238 Condition L (230° C., 2.16 kg weight)
   Yarn tensile strength, elongation, and Young's modulus: ASTM D 2256
   Yarn denier: ASTM D 1907
   Fabric grab tensile strength and elongation: ASTM D 4632
   Fabric trapezoidal tear strength: ASTM D 4533
   Fabric apparent opening size: ASTM D 4751
   Fabric basis weight: ASTM D 3776

Preparation of Yarn

Example 1

A resin blend was prepared from a mixture of 87.5 parts by weight of a polypropylene homopolymer resin with an MFR of 4 g/10 minutes, 1.5 parts by weight of a carbon black masterbatch (SCC 12085 from Standridge Color Corp., Social Circle, Ga.), 10 parts by weight of a polypropylene impact copolymer resin (Type 4180 from Total Petrochemicals USA, Inc.) with an MFR of 0.8 g/10 minutes, and 1.0 parts of a beta-nucleator masterbatch (MPM 1113 from Mayzo, Inc.). The blend was fed into a 2.5 inch single screw extruder with a 30/1 L/D with an inverse barrel zone temperature profile (525° F. set point in Zone 1 decreasing to 460° F. in Zone 6). The molten resin was transferred at 450° F. through a melt filter, melt pump, and 12-inch slot die before being deposited as a film onto a casting roll maintained at 209° F. The film had a residence time of 3 seconds on the heated roll, after which it was pulled through a nip tower and set of slitter blades. The slit yarns were then drawn to 9.0 times their original length while being passed though a forced air oven of 270° F. The drawn yarns were passed over a set of six 10-inch diameter annealing rolls that were maintained at 194° F., and then relaxed 3%. The relaxed yarns were taken up on bobbins at a speed of 524 feet per minute (fpm). As shown in Table I, the yarn had a denier of 1515, breaking strength of 20.2 lbs, tenacity of 6.1 g/den, elongation at break of 11.3%, initial modulus of 90.8 g/den, width of 109 mils, and thickness of 2.6 mils.

Control Yarn C1:

The procedure of Example 1 was repeated with a resin blend identical to that in Example 1 except that the beta-nucleator masterbatch was omitted. The resin formulation consisted of 88.5 parts by weight of a polypropylene homopolymer resin with an MFR of 4 g/10 minutes, 1.5 parts by weight of SCC 12085, and 10 parts of Total type 4180 impact copolymer polypropylene resin. An oriented polypropylene yarn was produced with a denier of 1528. Additional yarn properties are shown in Table I. Compared to the yarn in Example 1, this yarn had similar denier but lower tenacity and Young's modulus.

Example 2

The resin blend in Example 1 was processed in the same manner as in Example 1 except that the draw ratio was increased from 9.0× to 9.5×, leading to a yarn take up speed of 553 fpm. As shown in Table I, the yarn had a denier of 1412, which was achieved by adjusting the melt pump speed. Other properties of the yarn are shown in Table I.

Examples 3 and 4

The resin blend of Example 1 was processed in the same manner as in Example 1 except that the draw ratio was increased to 10.0× and 10.5× for the yarns of Example 3 and 4, respectively. Properties of those yarns are shown in Table I. The denier of the yarns was kept close to 1500 by adjusting the spacing on the blade bar and melt pump speed.

Control Yarns C2, C3, and C4:

The resin blend in Control C1 was processed in the same manner as in Examples 2 and 3, respectively, to produce control yarns C2 and C3. The properties of control yarns C2 and C3 are shown in Table I. Attempts to make a control yarn C4 with the resin blend in control C1 and the draw ratio in Example 4 (i.e., 10.5×) were unsuccessful due to frequent yarn breaks.

TABLE I

| Example No. | Draw Ratio | Denier | Tensile Strength (lbs) | Tenacity (g/den) | Elongation at Break (%) | Young's Modulus (g/den) | Width (mils) |
| --- | --- | --- | --- | --- | --- | --- | --- |
| 1 | 9.0 | 1515 | 20.2 | 6.1 | 11.3 | 90.8 | 109 |
| C1 | 9.0 | 1528 | 21.3 | 5.8 | 11.0 | 83.9 | 110 |
| 2 | 9.5 | 1412 | 22.0 | 7.1 | 11.6 | 97.7 | 102 |
| C2 | 9.5 | 1498 | 20.3 | 6.2 | 10.1 | 90.4 | 116 |
| 3 | 10.0 | 1570 | 21.5 | 6.2 | 9.6 | 96.1 | 109 |
| C3 | 10.0 | 1470 | 19.1 | 5.9 | 10.5 | 88.0 | 105 |
| 4 | 10.5 | 1364 | 21.0 | 7.0 | 9.2 | 109.0 | 101 |
| C4 | 10.5 | could not be made - frequent yarn breaks | | | | | |

Comparison of the properties of the yarns in Examples 1 through 3 with the control yarns C1 through C3, respectively, showed that at the same draw ratio, tenacities and tensile moduli were consistently higher in yarns with the beta-nucleator. Compared to control yarn C1, the Young's modulus of the yarn in Example 1 was 8% higher. Compared to control yarn C3, the Young's modulus of the yarn in Example 3 was 9% higher. Also, based on the comparison of Example 4 with control C4, the formulation containing the beta-nucleator was able to produce highly drawn yarns at higher draw ratios than an analogous formulation lacking the beta-nucleator.

Example 2 Woven Geotextile Fabric

The yarns shown in Table I were woven into 150-inch fabrics designed to meet the requirements of Class 3 fabrics of AASHTO M-288 material specification. Most class 3 woven fabrics have the following minimum average roll values: grab tensile strength of 200 lbs and trapezoidal tear strength of 75 lbs.

The fabric samples had a common warp with 16 warp ends per inch of 800 denier yarn. Warp yarns were 58 mils wide, 2.6 mils thick, and rectangular in cross section. Warp yarns were comprised of polypropylene homopolymer but did not contain a beta-nucleator. Fill yarns were interlaced with the warp yarns in a plain weave construction at an insertion rate of 255 picks per minute using a projectile loom. The fill yarn density was 12.5 picks per inch, leading to a total fabric weight of about 4.2 ounces per sq yd (osy). Fill direction properties were measured to determine the effect of the fill yarn on key fabric properties. The properties of fabrics woven with the yarns of Table I are shown in Table II.

TABLE II

| Fabric Example No. | Fill Yarn Example | Fill Yarn Draw Ratio | Fill Direction Grab Strength (lbs) | Fill Direction Tear Strength (lbs) | Apparent Opening Size (% retained)$^a$ | AOS Result$^b$ | Fabric Wt (osy) |
|---|---|---|---|---|---|---|---|
| 5 | 1 | 9.0 | 263 | 107 | 98.7 | pass | 4.32 |
| C5 | C1 | 9.0 | 205 | 76 | 92.9 | fail | 4.22 |
| 6 | 2 | 9.5 | 255 | 99 | 97.9 | pass | 4.20 |
| C6 | C2 | 9.5 | 224 | 90 | 98.8 | pass | 4.32 |
| 7 | 3 | 10.0 | 264 | 98 | 98.0 | pass | 4.13 |
| C7 | C3 | 10.0 | 235 | 85 | 96.8 | pass | 4.26 |
| 8 | 4 | 10.5 | 275 | 105 | 93.8 | fail | 4.29 |

$^a$= on a 40 mesh size US standard sieve
$^b$= passing result requires >95% retention Table II illustrates that the fabrics containing the beta-nucleated fill yarn unexpectedly showed improved fill-direction grab strength, tear strength, and particle hold out as measured by apparent opening size.

Figure 2:
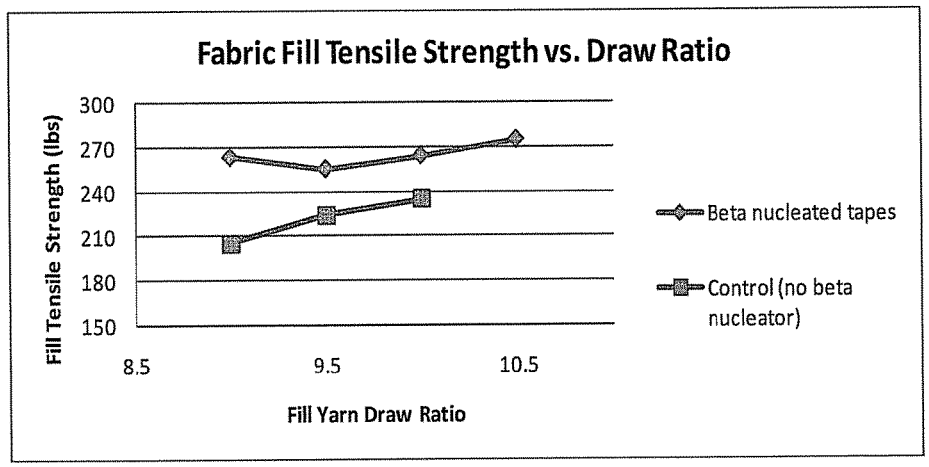
FIG. 2 illustrates a graph showing the relationship between Fabric Fill Tensile Strength vs Draw Ratio of the Yarn.
Figure 3:
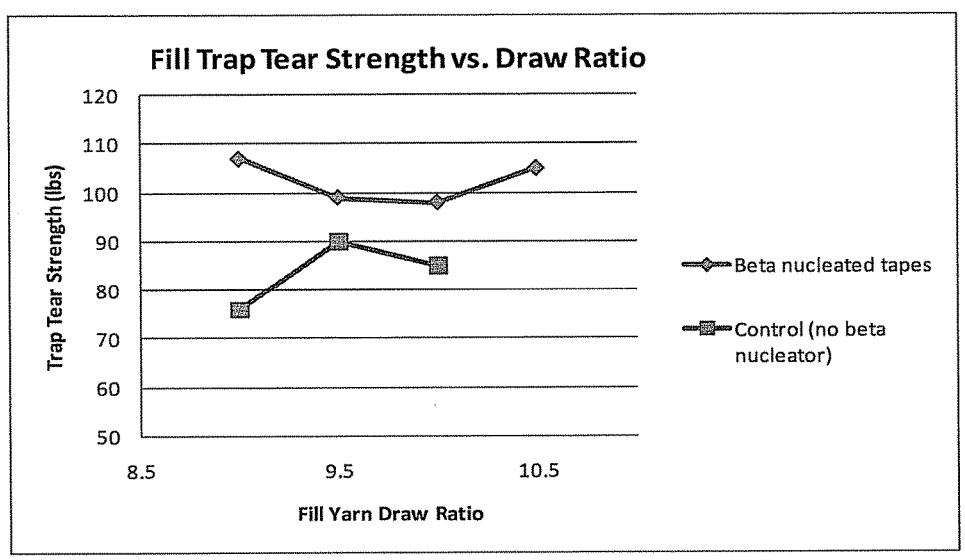
FIG. 3 illustrates a graph showing the relationship between Fabric Fill Trap Strength vs Draw Ratio of the Yarn.

The substantial improvements in grab tensile strength, tear strength, and particle holdout with the yarns containing beta-nucleators were surprising and unexpected. Regarding grab tensile strength and tear strength, fabrics made with yarns containing the beta-nucleator and drawn to the same extent as yarns not containing the beta-nucleator had consistently higher performance at all draw ratios tested. For example, compared to control fabric sample C5, which was made with yarns drawn 9.0× and had a grab tensile strength of 205 lbs, the fabric in Example 5 had a fill direction grab tensile strength of 263 lbs, a 28% improvement. Compared to control fabric sample C7, which was made with yarns drawn 10.0× and had a grab tensile strength of 235 lbs, the fabric in Example 7 had a fill direction grab tensile strength of 264 lbs, a 12% improvement. Even the fabric containing yarn drawn 10.5×(i.e., Yarn Example 4) produced fabric that had excellent grab tensile and tear strength properties. Regarding particle holdout properties, at the yarn draw ratios where a direct comparison could be made (i.e., draw ratios of 9.0×, 9.5× and 10.0×), all three fabrics made with beta-nucleated yarns passed the AOS test, but only two of three of the fabrics with non-beta-nucleated yarns passed. The only fabric with beta-nucleated yarn that did not pass the AOS test was made with fill yarn drawn 10.5×—a draw ratio not achievable without the beta-nucleant. See also FIGS. 2 and 3.

Figure 4:
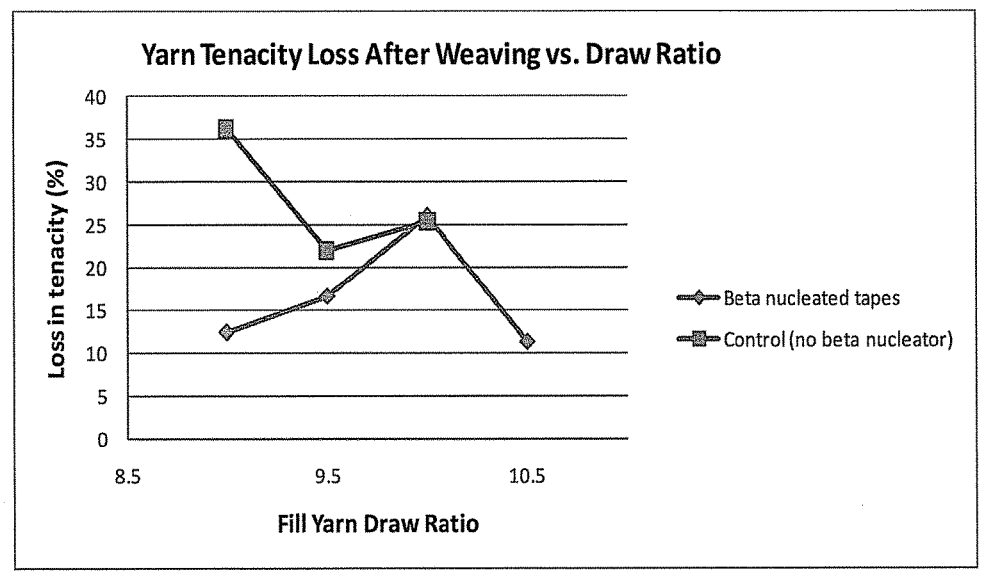
FIG. 4 illustrates a graph showing the relationship between Yarn Tenacity Loss after Weaving vs Draw Ratio of the Yarn.

Fill Yarn Properties after Removal from Fabrics:
Fill yarns of the fabrics of Table II were carefully removed and tested, as shown below in Table III. The results are also shown in FIG. 4.

TABLE III

| Fabric Example No. | Fill Yarn Example No. | Fill Yarn Draw Ratio | Tenacity - As Made (g/den) | Tenacity - After Weaving (g/den) | Tenacity Loss in Weaving (%) |
|---|---|---|---|---|---|
| 5 | 1 | 9.0 | 6.1 | 5.3 | 13 |
| C5 | C1 | 9.0 | 5.8 | 3.7 | 36 |
| 6 | 2 | 9.5 | 7.1 | 5.9 | 17 |
| C6 | C2 | 9.5 | 6.2 | 4.8 | 23 |
| 7 | 3 | 10.0 | 6.2 | 4.6 | 26 |
| C7 | C3 | 10.0 | 5.9 | 4.4 | 25 |
| 8 | 4 | 10.5 | 7.0 | 6.2 | 11 |

It is highly surprising and unexpected that after removal from fabric, the beta-nucleated fill yarns displayed a smaller loss in tenacity due to the weaving process than the identical non-nucleated yarns. The difference in the amount of tenacity loss was very large at a 9.0×draw ratio (i.e., only 13% for beta-nucleated yarn compared to 36% for the yarn without the beta-nucleator) and still significant at a 9.5×draw ratio. In addition, the tenacity loss with a 10.5×drawn beta-nucleated yarn was surprisingly low (11%).

Each of the patents, patent applications and articles cited herein is incorporated by reference. The use of the article "a" or "an" is intended to include one or more.

From the foregoing, it will be observed that numerous variations and modifications may be effected without departing from the spirit and scope of the application. It is to be understood that no limitation with respect to the specific article and/or method illustrated herein is intended or should be inferred. It is, of course, intended to cover by the appended claims all such modifications as fall within the scope of the claims.

The invention claimed is:

1. A woven geotextile fabric comprising a beta-nucleated, stiff, highly drawn, yarn or monofilament having a rectangular cross-section made of an extrusion of polypropylene homopolymer and a beta-nucleator reagent selected from the group consisting of 5,12-dihydroquino[2,3-b]acridine-7,14-dione; isophthalic acid; terephthalic acid; the disodium salt of o-phthalic acid; an aluminum salt of 6-quinizarin sulfonic acid; N', N'-dicyclohexyl-2,6-naphthalene dicarboxamide; and mixtures thereof wherein beta-crystallization of the yarn or monofilament is achieved by subjecting the extrusion to a temperature in the range of 190-220° F. for at least 2 seconds.

2. The woven geotextile fabric of claim 1 wherein the highly drawn, beta-nucleated polypropylene yarn or monofilament comprises a fill yarn.

3. The woven geotextile fabric of claim 1 wherein the highly drawn, beta-nucleated polypropylene yarn or monofilament comprises a warp yarn.

4. The woven geotextile fabric of claim 1 wherein the highly drawn, beta-nucleated polypropylene yarn or monofilament comprises both a fill yarn and a warp yarn.

5. The woven geotextile fabric of claim 1 comprising a weave selected from the group consisting of a plain weave, a twill weave, a satin weave, a half basket weave, and a crowfoot weave.

6. The woven geotextile fabric of claim 1 further comprising an additive selected from the group consisting of an opacifier, a pigment, a dye, a lubricant, an antistatic agent, an antioxidant, a UV absorber, and mixtures thereof.

7. The woven geotextile fabric of claim 1 wherein the highly drawn beta-nucleated yarn or monofilament has a denier in the range of 300 to 3000.

8. The woven geotextile fabric of claim 1 wherein the fabric comprises a plain weave.

9. A stiff, highly drawn beta-nucleated polymeric yarn or monofilament drawn at least nine times its original length comprising an extrusion of a polypropylene polymer and a beta-nucleator reagent selected from the group consisting of 5,12-dihydroquino[2,3-b]acridine-7,14-dione; isophthalic acid; terephthalic acid; the disodium salt of o-phthalic acid; an aluminum salt of 6-quinizarin sulfonic acid; N', N'-dicyclohexyl-2,6-naphthalene dicarboxamide; and mixtures thereof wherein the yarn has a rectangular cross-section and exhibits a greater tenacity and greater tensile modulus than an otherwise identical yarn or monofilament that did not include the beta-nucleator reagent but was processed under identical conditions wherein beta-crystallization of the yarn or monofilament is achieved by subjecting the extrusion to a temperature in the range of 190-220° F. for at least 2 seconds.

10. The highly drawn polymeric yarn or monofilament of claim 9 wherein the polypropylene polymer comprises a polypropylene homopolymer.

11. The highly drawn polymeric yarn or monofilament of claim 9 wherein the propylene polymer comprises a copolymer of polypropylene and one or more other olefins.

12. The highly drawn polymeric yarn or monofilament of claim 9 wherein the propylene polymer comprises a polypropylene homopolymer, a copolymer, and mixtures thereof.

13. The highly drawn polymeric yarn or monofilament of claim 9 wherein the polypropylene polymer comprises a mixture of a polypropylene homopolymer with a melt flow rate of 4 g/10 minutes and a polypropylene impact copolymer with a melt flow rate of 0.8 g/10 minutes.

14. The highly drawn polymeric yarn or monofilament of claim 9 further comprising an additive selected from the group consisting of an opacifier, a pigment, a dye, a lubricant, an antistatic agent, an antioxidant, a UV absorber, and mixtures thereof.

15. The highly drawn polymeric yarn or monofilament of claim 14 wherein the additive comprises carbon black.

16. The highly drawn polymeric yarn or monofilament of claim 9 wherein the beta-nucleator reagent comprises 5,12-dihydroquino[2,3-b]acridine-7,14-dione.

17. The highly drawn polymeric yarn or monofilament of claim 9 wherein the beta-nucleator reagent is present in the range of about 0.5 to about 5000 ppm.

* * * * *